Jan. 13, 1959  A. NEIMAN ET AL  2,868,007
ANTI-THEFT DEVICE

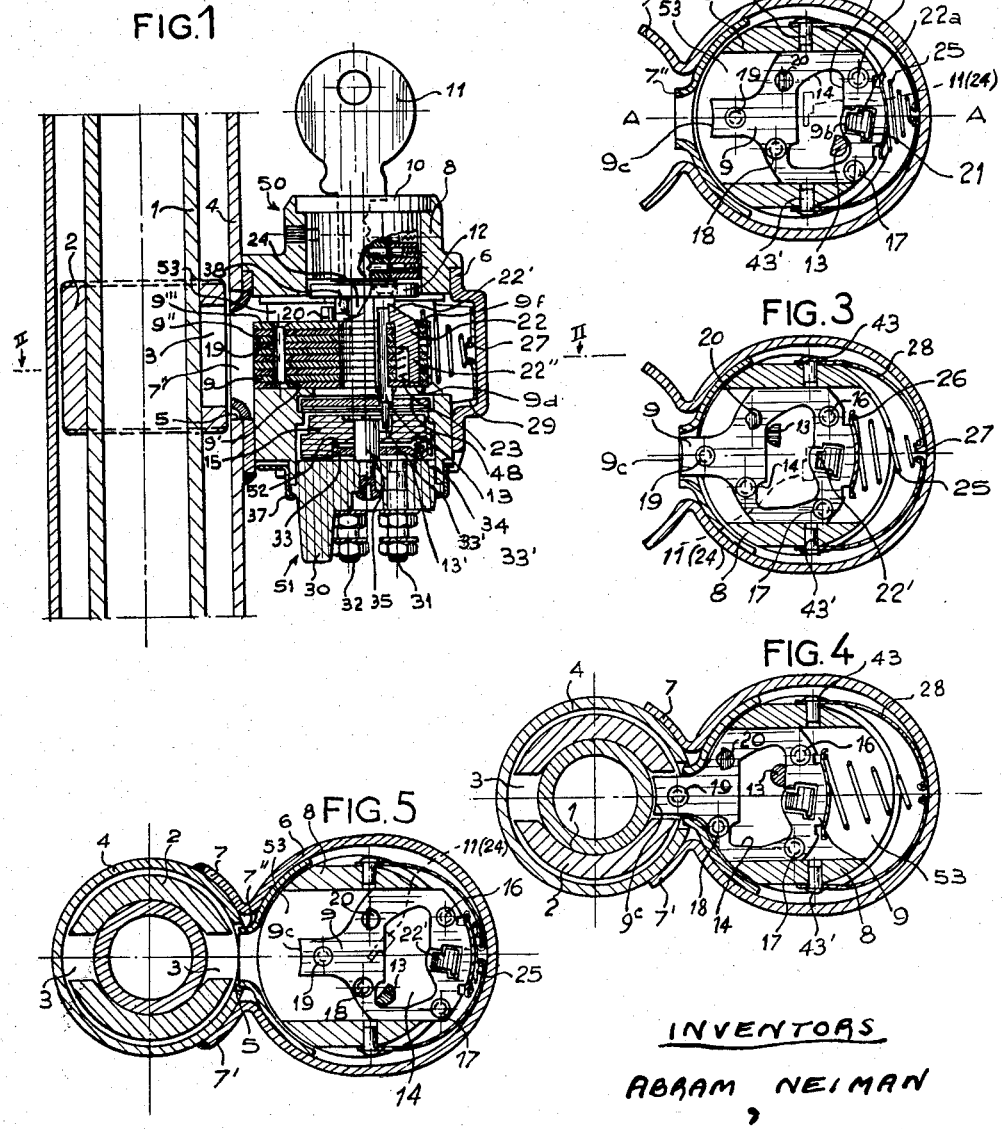

Filed March 6, 1956  3 Sheets-Sheet 2

INVENTORS
ABRAM NEIMAN
,
PAUL LIPSCHUTZ

INVENTORS

ABRAM NEIMAN
&
PAUL LIPSCHUTZ

United States Patent Office 2,868,007
Patented Jan. 13, 1959

2,868,007
ANTI-THEFT DEVICE

Abram Neiman, Neuilly, and Paul Lipschutz, Croissy, France, said Lipschutz assignor to said Neiman Application March 6, 1956, Serial No. 569,883

Claims priority, application France March 15, 1955

3 Claims. (Cl. 70—252)

This invention relates to theft preventing devices in motor vehicles, and more particularly to theft preventing devices by means of which the ignition circuit of a motor vehicle is broken or closed simultaneously with a blocking or release of a vital part of the motor vehicle such as the steering column, brakes or transmission.

An object of the invention is to provide a theft preventing device which may be readily inserted into a sleeve attached to one of the aforementioned parts of a motor vehicle like a cartridge is inserted into a rifle.

Another object of the invention is to provide a theft preventing device which may be set in various positions, such as a "start" position (wherein the locking mechanism is rendered inactive, the starter relay is supplied with current and the ignition circuit is closed), a "drive" position (wherein the locking mechanism is rendered inactive and the ignition circuit is closed), a "garage" position (wherein the locking mechanism is rendered inactive and the ignition circuit is interrupted) and a "stop" position (wherein the locking mechanism is rendered inactive and the ignition circuit is interrupted).

Another object of the invention is to provide a theft preventing device of above described type wherein upon a release of the key in the "start" position the elements of the device are automatically brought into the "drive" position.

A further object of the invention is to provide a theft preventing device of above described type which is equipped with safety means to prevent a thief from an unauthorized manipulation of the device.

Other objects and structural details of the invention will be apparent from the following description when read in conjunction with the accompanying drawings forming part of the specification, wherein:

Fig. 1 is a vertical sectional view of a portion of a steering column of a motor vehicle and of a theft preventing device according to the invention.

Figs. 2–5 are horizontal sectional views of the theft preventing device shown in Fig. 1, taken on line II—II, wherein, however, the elements of the device are in different positions.

Figure 6:
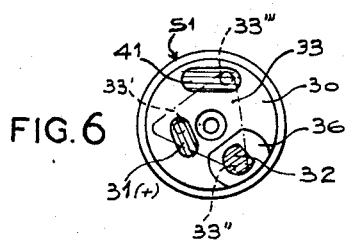
Fig. 6 is a partial plan view of the theft preventing device shown in Fig. 1 as seen from the bottom.

Referring now to Fig. 1, 1 generally indicates a steering column of a motor vehicle. A sleeve 2 having a recess or notch 3 (see Figs. 1, 4 and 5) is rigidly connected with said steering column 1 by welding, soldering or by means of screws or the like. The steering column 1 is housed within a tube 4, the latter having an opening 5.

The theft preventing device generally indicated by 50 is inserted into a holder 6, preferably made of pressed sheet iron. Said holder 6 is substantially in the shape of a housing open at the top and bottom as seen in Fig. 1. The holder or housing 6 is rigidly connected with the tube 4 by means of flanges 7 and 7' welded to said tube 4. The arrangement is made in such manner that the hollow neck portion 7" of a member mounted within the housing 6 extends into the opening 5 of the tube 4. The bore of the neck portion 7" is in register with the recess 3 of the sleeve 2 attached to the steering column 1.

The body 8 carrying the elements of the theft preventing device 50 can be inserted into the housing or holder 6 like a cartridge into a rifle, after the movable bolt 9 of the device has been brought by a key 11 into a retracted position, preferably into the position which will be termed hereinafter the "garage" position. The bolt 9 is radially (with reference to holder 6) displaceable in a radially extending slot 53 of the body 8.

As shown in Fig. 1, the theft preventing device comprises a lock 10 of the cylinder type which may be operated by a key 11. A disk 12 is connected with the rotatable cylinder of the lock 10 so as to participate in a rotation of said cylinder by the key 11. A controlling means or finger 13 connected with and actuatable by the disk 12 and passing through a slot 14 (see Figs. 2–5) is of special configuration and has an extension 13' operatively engaged with the rotatable portion 15 of an electric switch generally indicated by 51. Thus, the switch 51 may be controlled by a key 11 inserted into the lock 10.

Preferably, the bolt 9 is made of a plurality of superimposed sheet metal plates for example, of steel which are connected with each other by rivets 16, 17, 18, 19, 20. All of the plates of the bolt 9 are of substantially the same shape with the exception of their apertures 21. The shape of said aperture 21 in some of said plates differs from that in others, so as to provide for a proper engagement, positioning and guiding of a safety pin or engaging means 22 biased by a spring 23. If the bolt 9 is radially displaced to the left (as viewed in Fig. 1) and the pin 22 is displaced to the left to such an extent that the end portion 24 of a key 11 inserted into the lock 10 may be urged against the inclined head 22' of said pin 22. The pin 22 is thus depressed against the action of the spring 23 so that a portion of the tail 22" of the pin 22 will project from an opening 9d of the lowermost plate 9' of the bolt 9, while the head 22' of the pin 22 disappears into the apertures 21 of the upper plates 9" and 9'''. On the other hand, an abutment 9f near the end of the aperture 21 of the uppermost plate 9''' cooperates with a shoulder on the pin 22 for limiting the upward movement of the latter under the action of its spring 23.

A conical spiral spring 25 arranged between the wall of the holder 6 and a washer 26, shaped in accordance with the bolt 9, and arranged on the outside of the latter urges the bolt 9 to the left as viewed in Fig. 1. The right hand end of the conical spiral spring 25 is riveted onto or anchored around a protruding portion 27 of a flat spring 28 arranged in the bulge portion of the housing 6. Both ends of the flat spring 28 are provided with slots for slidable engagement with rivets 43, 43' or the like carried by the body 8 of the device 50. The conical spiral spring 25 in combination with the flat spring 28 forms a telescopic spring.

The switch 51 comprises the rotatable member 15 and a stationary member 30 carrying three terminals 31, 32 and 41. (Fig. 1 illustrates only the terminals 31 and 32, but all three terminals 31, 32 and 41 are shown in Fig. 6.) The rotatable member 15 of the switch 51 has a recess 52 accommodating a contact plate 33 which is urged against the stationary member 30 by three springs 34 (only one being shown in Fig. 1). The contact plate 33 has three contacts 33', 33'', 33''' formed by dents (only one of said contacts being shown in Fig. 1, while all of them are shown in Fig. 6). The rotatable and stationary members 15 and 30 of the switch 51 are operatively connected with each other by a pin 35 or the like having cross-sections of different diameters forming suitable shoulders. In order to assure a high degree of insulation of the terminal 32, which is connected to a relay of the starter of the motor vehicle, said post is mounted, as shown in Fig. 6, in a disk 36 made of a highly resistant insulating material. The stationary body 30 may be made of a rather inexpensive, shock-resistant material, such as a material known in the trade as "Bakelite." The terminal 32 itself retains the disk 36 on the stationary member 30. The entire switch 51 is held in its position in the holder 6 by a cap 37 screwed onto said holder 6.

The operation of the theft preventing device according to the invention is as follows:

The key 11 is inserted into the lock 10 and the disk 12. During a rotation of the key 11 and disk 12 in clockwise direction, the finger 13 abutting against the wall 9a (see Fig. 2) of the slot 14 of the bolt 9 brings the bolt 9 into the somewhat retracted position shown in Fig. 2 and the spring 25 is somewhat compressed. When the bolt 9 is in said partially retracted position of Fig. 2, the eccentrically positioned finger 13 being below the longitudinal axis A—A of the bolt 9, as seen in Fig. 2, is partially locked behind a projection 9b of the wall of the slot 14, whereby the bolt 9 is held in the so-called "drive" position.

The above described rotation of the key 11 in clockwise direction causes also a rotation of the contact plate 33 by the end portion 13' of the eccentric finger 13, whereby two of its contacts 33', 33'', 33''' are brought into contact with the terminals 31 and 41 for closing the ignition circuit. The lock 10 is so constructed that it is impossible to withdraw the key when the lock is in the above described "drive" position.

In order to stop the engine of the motor vehicle subsequently, the key 11 is turned in counter-clockwise direction, whereby the elements of the device are brought into the position shown in Fig. 3. The bolt 9, urged in the left hand direction (as viewed in Fig. 3) by the spring 25, cannot, however, penetrate into the slot 3 (see Fig. 1) of the sleeve 2, as the head 22' of the pin or catch 22 comes into abutting engagement with the lower end of the key 11 projecting from the lock 10. During the above described counter-clockwise rotation of the key 11, the finger 13, 13' causes likewise a counter-clockwise rotation of the rotary switch member 15 and the contact plate 33, whereby the latter is disengaged from the terminal 31 connected with the battery. Therefore, the ignition circuit is interrupted when the elements are in the position shown in Fig. 3.

When the elements of the lock are in above described "stop" position as shown in Fig. 3, the key 11 can be withdrawn as the tumblers of the lock 10 are in alignment with each other. Upon withdrawal of the key 11, the latter no longer retains the bolt 9 in the position shown in Fig. 3 by its engagement with the catch 22 and the bolt is free to snap into locking engagement in the slot 3 of the sleeve 2 under the action of the spring 25, as shown in Fig. 4. This position may be called the "locked stop" position. In this condition, the steering column 1 cannot be rotated.

There is, further, an intermediate position between the positions shown in Fig. 2 and Fig. 3, i. e. the so-called "garage" position. In this "garage" position the circuit is broken and the key can be withdrawn without causing a blocking of the steering system by a release of the bolt 9, so that the steering column can be operated at will in a garage.

The device is readily changed from the condition in Fig. 4 to the condition in Fig. 2. When the bolt 9 of the device is in the blocking position shown in Fig. 4 and the key is re-inserted, the protruding end 24 of the key 11 coming into engagement with the inclined edge 22' of the catch 22 causes a depression of said catch 22 against the spring 23. Thus, the key 11 with the cylinder and disc 12 of the lock 10 may be turned for bringing the bolt 9 from the position shown in Fig. 4 into the position shown in Fig. 2 wherein the steering column is unlocked and the ignition circuit is closed.

If the clockwise rotation of the key 11 is continued beyond the "drive" position illustrated by Fig. 2, a controlling means or projection 38 (Fig. 1), rigid with the rotatable disk 12 of the lock 10 comes into engagement with a lug 20 of the bolt 9; the latter is thus withdrawn into the extreme position shown in Fig. 5, wherein the spring 25 is completely compressed. At the same time the contact plate 33 of the switch 51 rotated by the member 15 is brought into the position shown in Fig. 6, wherein its three contacts 33', 33'', 33''' are in contact with the three terminals 31, 32, 41 so that the ignition coil is supplied with current through the terminals 31 and 41, while the relay of the starter is supplied with current through the terminals 31 and 32. Thus, this position of the elements as shown in Figs. 5 and 6 may be called the "start" position.

Upon starting the motor in the described manner, the key 11 is released, so that the bolt 9 may return under the action of the telescopic spring 25, 28 from the position shown in Fig. 5 into the position shown in Fig. 2. In the latter position the eccentrically mounted finger 13 is stopped by the projection 9b at the configuration of the slot 14, so that the ignition circuit remains unbroken and the motor may continue to run.

Preferably, the lug 20 and the projection 38 cooperating with each other for activating the starter of the engine are made of a hard material which has been specially treated to prevent undue wear and tear.

The inclined edge 22' of the pin or catch 22 serves also a second purpose. If during a withdrawal of the key 11 for a locking of the steering column, the slot 3 of the sleeve 2 of the steering column does not register with the bolt 9 (and, consequently, the bolt 9 cannot penetrate into the slot 3), the bolt 9 advances only about .04 of an inch, a distance corresponding to the clearance provided between the sleeve 2 and the opening 5 of the tube 4. When a false key or some flat object is inserted into the key hole for holding the bolt 9 in said incompletely advanced position, the flat object comes into engagement with said inclined edge 22' of the pin or catch 22; thus, on one hand, said flat object cannot hold the bolt 9 in the incompletely advanced position and, on the other hand, it urges the bolt 9 forwardly in left hand direction (as viewed in Fig. 3) so that, as soon as during an operation of the steering column the slot 3 registers with the bolt 9, the flat object or false key cooperates for urging the bolt 9 into locking engagement with the slot 3 of the sleeve 2.

Figure 7:
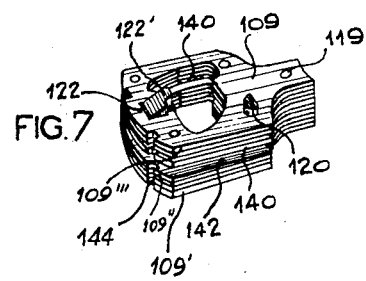
Fig. 7 is a perspective view of another embodiment of a bolt forming part of the theft preventing device shown in Fig. 1.

Fig. 7 illustrates a different embodiment of a bolt 109 for use in a device as shown in Fig. 1. According to Fig. 7 the pin or catch 122 having an inclined surface 122' is rigid or integral with a plate 140 interposed between the plates 109', 109'', 109'''. Said plate 140 is either resilient or is under the action of springs (not shown) so that the assembly of plate 140, the upper plates 109''' and the catch 122 performs the same function as the catch 22 of the bolt 9 shown in Figs. 1–5 with its spring 23 described above. When according to the embodiment of Fig. 7, the key exerts pressure on the inclined surface 122', the plate 140 rocking on the rivet 119 is pressed into the space 142 provided between the plates 109''' and 109'. The uppermost plate 109''' also carries the projection 120.

As may be readily gathered from Figs. 2–5, the end surface 9c of the bolt 9 is of concave shape having a radius substantially equal to that of the sleeve 2, whereby the locking engagement of the bolt 9 with the sleeve 2 may be artificially increased by about .02 of an inch. This feature is utilized so as to facilitate the engagement of the end 24 of the key 11 with the inclined surface 22' of the catch 22 as described above.

Figure 8:
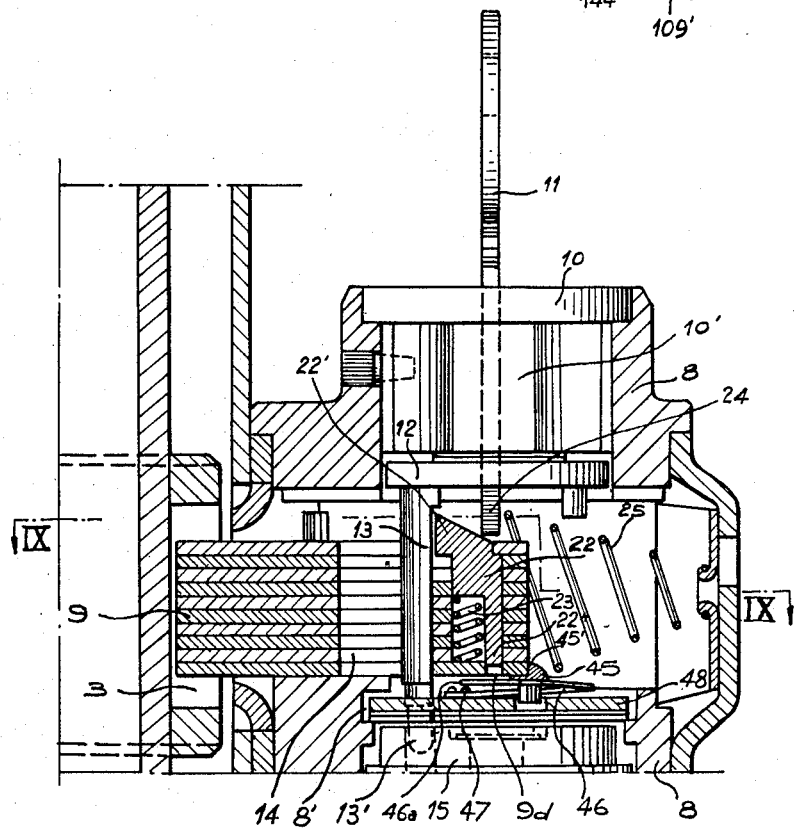
Fig. 8 is a fragmentary, vertical, sectional view of another embodiment of a theft preventing device attached to a steering column of a motor vehicle.
Figure 9:
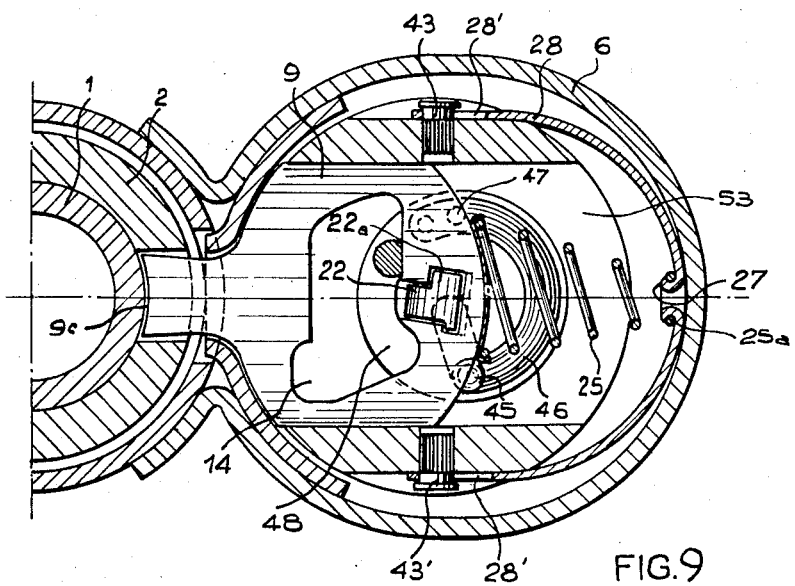
Fig. 9 is a horizontal sectional view of the device shown in Fig. 8 taken on line IX—IX of Fig. 8.

Preferably, as shown in Figs. 8 and 9 an additional safety feature is incorporated in a theft preventing device according to the invention.

When bolt 9 is in its locking position and the end 24 of a key 11 exerts pressure on the inclined surface 22' of the catch 22, the opposite end 22" of the catch passing through the opening 9d of the bottom plate of the bolt 9 depresses the end 46a of a spring 46 so as to release a pawl 45 attached to said spring 46. Upon release of said pawl 45 the bolt 9 is free to be brought back to one of the above described three positions, called "garage," "drive" or "start" position. The end of the spring 46, 46a opposite to the pawl 45 is secured by means of a rivet 47, for example to a closing disk 48 embedded in a recess 8' of the member 8 in order to prevent a thief from access to the bolt 9 after having dismounted the switch (not shown in Fig. 8). The end 13' of the finger 13 actuated by the rotatable portion 10' of the lock 10 passes through the closing disk 48 so that the latter may participate in the rotation of said portion 10'.

As soon as, upon a rotation of the key in the opposite direction for returning same from one of the three positions "drive," "start" or "garage" to the "stop" position, the bolt 9 comes into engagement with the slot 3 of the sleeve 2, the catch 22 is urged upwardly by its associated spring 23. Owing to this upward movement of the catch 22 the lower end 22" thereof disappears within the bolt 9, so that now the pawl 45 may block the rear portion of the bolt 9 by means of its sharp edged portion for preventing a return of the bolt 9 from its locking position.

On the other hand, the pawl 45 has a surface 45' (Fig. 8) being inclined in the opposite direction so as to prevent the pawl from getting caught, for example, by the slot 14 of the bolt 9 when the latter is in one of the three positions "garage," "drive" or "start." But, even if the pawl 45 should get caught, the inclined surface 45' would permit a sliding movement of the pawl 45 under the action of the spring 25.

As clearly shown in Fig. 9, the conical spiral spring 25 is attached to the flat spring 28 by an engagement of its smallest coil 25a with the flanged portion of a protrusion 27 on said flat spring 28.

The pin or catch 22 is of an asymmetrical shape. On one hand it is desirable that the head 22' (see Fig. 8) of the catch is as narrow as possible in order to render it difficult for a thief to insert a foil or some other matter through the lock for reaching the catch. On the other hand, however, the portion of the catch 22 remaining out of contact with a key projecting from the lock 10 shall have a surface as large as possible so that the bolt 9 may be retained even if the finger 13 breaks. The portion 22a (Fig. 9) of the catch 22 projects upwardly so that, as may be gathered from Figs. 2 and 5, it may come into engagement with the lower end 24 (Fig. 1) of a key 11 for being retained by the latter, even if the finger 13 is broken. Thus an additional safety arrangement is obtained.

Preferred embodiments of the invention have been described, but it is understood that this disclosure is for the purpose of illustration, and that various omissions and changes in shape, proportion and arrangement of parts, as well as the substitution of equivalent elements for the arrangements shown and described can be made without departing from the spirit and scope of the invention as set forth in the appended claims.

Furthermore, although the drawings illustrate the theft preventing device attached to the steering column of a motor vehicle, it is understood that a theft preventing device according to the invention may also be used in conjunction with other vital parts of a motor vehicle, such as brakes or transmission, for blocking same.

What we claim is:

1. In a theft preventing device for use in a combination with a lockable part of a motor vehicle having an ignition circuit and a starter circuit, said device comprising: a body having a slot, a bolt displaceable in said slot, said bolt being settable in retracted positions and in a position partly protruding from said body for locking engagement with said lockable part, an actuating member rotatably mounted in said body, said actuating member having a passage for receiving a lock-key for operation by the latter, a switch including stationary terminal means and movable contact means, a series of terminals on said terminal means for connection with said circuits, controlling means operatively coupling said rotatable actuating member to said displaceable bolt and said movable contact means for causing a simultaneous displacement of said bolt and said movable contact means in coordination with a rotation of said actuating member, said actuating member being settable in a "stop" position wherein the contact means interrupts the ignition and starter circuits at the terminals, in a "drive" position wherein the contact means closes the ignition circuit and interrupts the starter circuit at said terminals and in a "start" position wherein the contact means closes the ignition and starter circuits at said terminals, said bolt being in a retracted position when said actuating member and contact means are in said "stop," "drive" and "start" positions, engaging means on said bolt, and an actuating spring acting on said bolt for urging same into its protruding position, said engaging means being in engagement with the lock-key inserted into said actuating member and projecting from the latter, when said actuating member is in said "stop" position so as to hold said bolt in a retracted position, said actuating spring being released for urging said bolt into its protruding position for locking engagement with said lockable part upon withdrawal of the lock-key from said actuating member and, thus, disengagement from said engaging means, said controlling means including first controlling means operatively coupling said rotatable actuating member to said displaceable bolt and said movable contact means for causing coordinated movements of said actuating member, said bolt and said contact means during movements between said "stop" and "drive" positions, and second controlling means including a first lug on said actuating member and a second lug on said bolt, said lugs being positioned for displacing said bolt when a rotation of the actuating member from the "stop" position to the "drive" position is continued beyond said "drive" position.

2. In a theft preventing device for use in a combination with a lockable part of a motor vehicle having an ignition circuit and a starter circuit, said device comprising: a body having a slot, a bolt displaceable in said slot, said bolt being settable in retracted positions and in a position partly protruding from said body for locking engagement with said lockable part, an actuating member rotatably mounted in said body, said actuating member having a passage for receiving a lock-key for operation by the latter, a switch including stationary terminal means and movable contact means, a series of terminals on said terminal means for connection with said circuits, controlling means operatively coupling said rotatable actuating member to said displaceable bolt and said movable contact means for causing a simultaneous displacement of said bolt and said movable contact means in coordination with a rotation of said actuating member, said actuating member being settable in a "stop" position wherein the contact means interrupts the ignition and starter circuits at the terminals, in a "drive" position wherein the contact means closes the ignition circuit and interrupts the starter circuit at said terminals and in a "start" position wherein the contact means closes the ignition and starter circuits at said terminals, said bolt being in a retracted position when said actuating member and contact means are in said "stop," "drive" and "start" positions, engaging means on said bolt, and an actuating spring acting on said bolt for urging same into its protruding position, said engaging means being in engagement with the lock-key, inserted into said actuating member and projecting from the latter, when said actuating member is in said "stop" position so as to hold said bolt in a retracted position, said actuating spring being released for urging said bolt into its protruding position for locking engagement with said lockable part upon withdrawal of the lock-key from said actuating member and, thus, disengagement from said engaging means, said bolt having an aperture, said engaging means being slidably mounted in said aperture, cooperating abutting means on said bolt and said engaging means for limiting the movement of the latter, resilient means engaged with said engaging means for urging same into an extreme position wherein the upper position thereof projects from said bolt, and a movable pawl for controllable locking engagement with said bolt for holding the same in its protruding position, and said engaging means being movable for actuating said pawl for disengagement from and release of said bolt upon the moving said engaging means by the key inserted into said actuating member.

3. In a theft preventing device as claimed in claim 2 additional resilient means acting on said pawl for urging the same into its locking position.

References Cited in the file of this patent

UNITED STATES PATENTS

| | | |
|---|---|---|
| 1,786,186 | Bauermeister | Dec. 23, 1930 |
| 2,022,958 | Gilpin | Dec. 3, 1935 |
| 2,036,776 | Rubner | Apr. 7, 1936 |
| 2,101,446 | Neiman | Dec. 7, 1937 |
| 2,679,557 | Miller | May 25, 1954 |
| 2,695,932 | Jacobi | Nov. 30, 1954 |
| 2,720,393 | Valentine | Oct. 11, 1955 |

FOREIGN PATENTS

| | | |
|---|---|---|
| 572,566 | Great Britain | Oct. 15, 1945 |
| 738,276 | France | Oct. 12, 1955 |